Dec. 2, 1958

R. J. EHRET 2,863,113

CURRENT CONTROL APPARATUS

Filed Feb. 13, 1957

INVENTOR.
ROBERT J. EHRET

BY *Arthur H. Swanson*

ATTORNEY.

United States Patent Office 2,863,113
Patented Dec. 2, 1958

2,863,113

CURRENT CONTROL APPARATUS

Robert J. Ehret, Los Altos, Calif., assignor to Minneapolis-Honeywell Regulator Company, Minneapolis, Minn., a corporation of Delaware Application February 13, 1957, Serial No. 639,874

5 Claims. (Cl. 323—4)

This invention relates to energy regulating means and more particularly to regulating means for providing a constant current output.

A general object of this invention is to provide an improved self-regulating constant current supply apparatus.

A more specific object of this invention is to provide a reliable improved self-regulating constant current supply apparatus in which a dynamometer and a moving coil galvanometer, both without restoring springs, act to reposition the control element of a variable current source to maintain a constant current.

In the preferred form of this invention, a vane controlled oscillator circuit of known type, such as that disclosed in Patent No. 1,944,988, is used as the variable current supply. Other forms of this oscillator circuit, as well as other variable current supplies, such as a battery and rheostat combination, in which the current can be varied by repositioning the control element, would be suitable as the variable current supply in other physical embodiments of the invention.

By varying the position of a metallic vane between the coils of the oscillator circuit, the direct current component of the plate current can be varied over an operating range. This direct current portion of the plate current is the controlled current and, in accordance with the present invention, flows through the series connected dynamometer and moving coil galvanometer. The dynamometer and moving coil galvanometer are linked by mechanical connecting means in such a manner that the moving coils of the dynamometer and moving coil galvanometer exert turning moments in opposite directions on the connecting means. Thus, no restoring springs are needed in the dynamometer or moving coil galvanometer, since each device provides the restoring moment for the other. To the connecting means is attached an arm carrying the metallic vanes. The arrangement is such that for a predetermined value of current the turning moments of the dynamometer and the moving coil galvanometer will be opposite and equal, in consequence of which the resulting moment is zero.

The present invention makes use of the known principle that a dynamometer exerts a turning moment proportional to the square of the current, whereas the moving coil galvanometer exerts a turning moment directly proportional to the current. These dynamometer and galvanometer components are so arranged that, for currents above the predetermined, desired value, the turning moment of the dynamometer will exceed that of the moving coil galvanometer. The vane then will be withdrawn from between the coils of the oscillator circuit an amount sufficient to reduce the direct current component of the plate current to the predetermined value at which the turning moments of the dynamometer and moving coil galvanometer are equal. For currents below the desired value, the turning moment of the moving coil galvanometer will be greater than that of the dynamometer. The vane then will be moved into the space between the coils a sufficient amount to increase the plate current to the desired value at which the turning moments are again equal.

Thus, the current will be controlled at a value determined by the constants of the dynamometer and the moving coil galvanometer, and will be unaffected by normal variations in the parameters of the variable current supply source. The use of the vane in the oscillator circuit as the control element makes the arrangement an extremely sensitive one by eliminating any contact between the vane itself and the coils.

This invention provides an improved constant current supply which obviates the periodically standardized current source and is independent of normal variations and drift in the supply voltages and electronic components which are inherent in many electronic constant current supply systems.

A better understanding of the present invention may be had from the following description read with reference to the accompanying drawings, of which;

Figure 1:
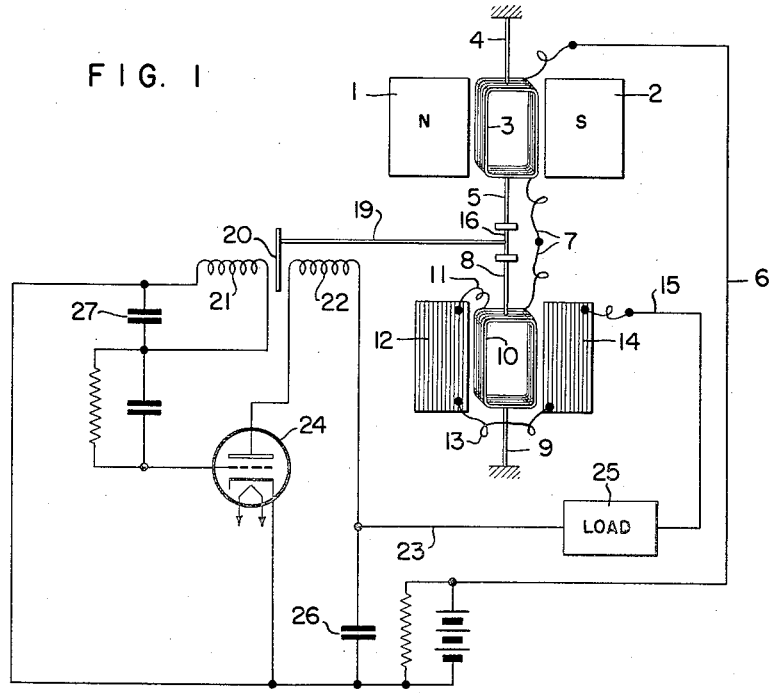
Fig. 1 is a diagram illustrating the preferred form of this invention.

In the specific embodiment shown in Fig. 1, I have provided a permanent magnet moving coil galvanometer, hereafter referred to as the galvanometer, provided with a moving coil 3 disposed in the magnetic field of the permanent magnet poles 1 and 2, and mounting means 4 and 5 for the moving coil 3. The mounting means 4 and 5 allow the moving coil 3 to rotate freely without exerting any substantial restoring torque on the moving coil 3. Also provided is a dynamometer type device having a moving coil 10, mounting means 8 and 9 for this moving coil, and stationary coils 12 and 14. The mounting means 8 and 9 allow the moving coil 10 to rotate freely without exerting any substantial restoring torque on the moving coil 10. The mounting means of each coil rotate with their respective coils. The conductor 6 conducts current through the moving coil 3 of the galvanometer. The conductor 7 connects the moving coil 3 of the galvanometer in series with the moving coil 10 of the dynamometer, the conductor 11 connects the moving coil 10 in series with the stationary coil 12, and the conductor 13 connects the stationary coil 12 in series with the stationary coil 14. The galvanometer and dynamometer are so arranged that when energized by a current through conductors 15 and 6, the moving coil 3 of the galvanometer will tend to rotate in one direction, and the moving coil 10 of the dynamometer will tend to rotate in the opposite direction. A connecting link or output means 16 is attached to the mounting means 5 of the galvanometer moving coil 3 and the mounting means 8 of the dynamometer moving coil 10 so that the output means 16 is acted on by opposite torques and responds to the more powerful of the torques exerted by the two moving coils. It is understood that any suitable connecting link between the two moving coils 3 and 10 responsive to the differential of the torques exerted by these moving coils may be used. Thus, since the output means 16 is rigidly attached to the moving coils 3 and 10, it is evident that, when the dynamometer and galvanometer are energized, the output means 16 and both moving coils will rotate in the same direction as the moving coil exerting the greatest torque for a particular current value.

As is well understood, when energized, the moving coil 3 of the galvanometer will produce a torque proportional to the current through it, and the moving coil 10 of the dynamometer will exert a torque proportional of the square of the current through it. The constants of the dynamometer and the galvanometer can be so chosen that for currents below a predetermined value the moving coil 3 of the galvanometer will exert a greater torque than the moving coil 10 of the dynamometer and therefore both moving coils and the output means 16 will rotate in the direction in which the moving coil of the galvanometer 3 rotates. For currents above the predetermined value, since the torque vs. current characteristics of the dynamometer moving coil 10 follow a square law and the torque output of the moving coil 3 of the galvanometer follows a linear relationship, the torque of the moving coil 10 of the dynamometer will predominate and both moving coils and the connecting link 16 will be constrained to rotate in the direction of the moving coil 10 of the dynamometer. This is more clearly illustrated in Fig. 2 in which the torque vs. current characteristics of the galvanometer and dynamometer are plotted on the same graph.

Figure 2:
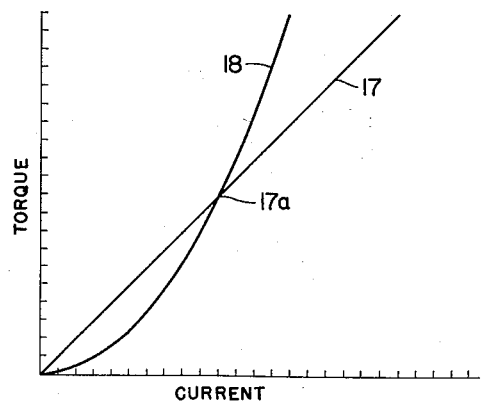
Fig. 2 is a graph of the torque vs. current characteristics of the dynamometer and permanent magnet moving coil galvanometer.

Referring to Fig. 2, the linear curve 17 shows the current vs. torque characteristics of the galvanometer, and the square function curve 18 illustrates the current vs. torque characteristics of the dynamometer. As can be seen, although the torque curve 18 of the dynamometer is less than the torque curve 17 of the galvanometer for low values of current, since the torque of the dynamometer increases as the square of the current, the torques of the two instruments become equal at a definite current value shown by the intersection 17a of the two torque curves, and for currents in excess of this value, the torque of the dynamometer becomes increasingly greater than that of the galvanometer. Thus, it is evident that this combination of galvanometer and dynamometer when energized through the conductors 6 and 15 will produce a motion of the output means 16 in one direction or another depending upon whether the energizing current is above or below a predetermined value at which the torques of the moving coils are equal.

Referring again to Fig. 1, a vane controlled oscillator circuit is used as the variable current source. As is well understood, by those skilled in the art, with a proper choice of circuit constants this circuit will provide a direct current through the conductors 6 and 23 which varies with the relative position of the vane 20 to the coils 21 and 22.

The triode 24 is electrically connected in a suitable manner so as to normally oscillate at radio frequencies, the oscillatory condition being promoted by an electrical interlinkage between the grid or input circuit and the plate or output circuit. As shown, the interlinkage is an inductive one, and it is obtained by means of two inductively associated windings or coils 21 and 22 which are connected in the grid and plate circuits respectively. The inductive interlinkage may be interrupted as desired by interposing the vane 20 between the coils, this vane being made of a suitable electrical conductive material such as copper, aluminum, etc. As the vane 20 is interposed between the two windings 21 and 22, but without touching the windings themselves or other parts, it serves to isolate them from each other, whereupon the oscillations in the plate circuit decrease and finally cease as the vane 20 is more fully interposed, with the result that the non-pulsating direct current portion of the plate circuit current gradually increases in value. This non-pulsating direct current is passed through the conductor 6 to the series connected moving coils 3 and 10, the stationary coils 12 and 14, and the load 25, which are connected in such a manner that only the non-pulsating current will pass through them. A condenser 26 serves as a bypass for the pulsating component of the plate current when the tube is oscillating although the direct current component cannot pass through the condenser 26 and must therefore pass through the parallel circuit including the moving coil 3 of the galvanometer, the moving coil 10 and stationary coils 12 and 14 of the dynamometer, and the load 25. Connected across the coil 21 is a suitable condenser 27 which forms a suitably tuned oscillation circuit with the winding 21 as is well known in the art.

Figure 3:
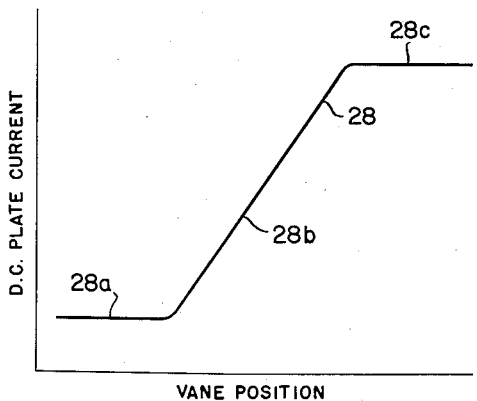
Fig. 3 is a curve illustrating the non-pulsating plate current of the vane controlled oscillator circuit as a function of vane position.

The general variation of the non-pulsating current as a function of vane position is graphically illustrated in Fig. 3, in which the curve 28 is plotted with the non-pulsating current as the ordinate and the distance the vane 20 is moved as the abscissa. The horizontal portion 28a indicates the non-pulsating plate current when the triode 24 is oscillating, which is the condition when the vane 20 is not interposed between the coils 21 and 22. The inclined portion 28b indicates the gradual rise of the non-pulsating current as the vane 20 is inserted between the coils 21 and 22. The upper horizontal portion 28c shows the maximum non-pulsating plate current when the triode 24 has stopped oscillating.

Attached to the output means 16 is the member 19 carrying the vane 20. As the output means 16 is rotated in a clockwise direction, the vane 20 is moved into the space between the coils 21 and 22 causing an increase in non-pulsating current. As the output means 16 is rotated in a counterclockwise direction, the vane 20 is withdrawn from between the coils, decreasing the non-pulsating current as shown by the curve 28 in Fig. 3.

As shown in Fig. 2, when the galvanometer, dynamometer, and load are energized by the non-pulsating current through the conductors 6 and 23, the moving coil 3 of the galvanometer exerts a clockwise torque on the output means 16, and the moving coil 10 of the dynamometer exerts a counterclockwise torque on the output means 16. Therefore, when the non-pulsating current in the load 25, the moving coils 3 and 10, and the stationary coils 12 and 14 is below the value at which the torques of the two moving coils are equal, the output means 16 and the member 19 will rotate in a clockwise direction, moving the vane 20 further into the coils 21 and 22 and increasing the non-pulsating current to the value where the torques are equal. Similarly, when the non-pulsating current is greater than the value at which the torques of the moving coils 3 and 10 are equal, the torque exerted by the moving coil 10 of the dynamometer will predominate and the output means 16 and member 19 will rotate in a counterclockwise direction, moving the vane 20 out from between the coils 21 and 22 to the point where the non-pulsating current is decreased to the value of equal torques. Thus, it is evident that the action of the galvanometer and dynamometer connected by the output means 16 will be to continually reposition the vane 20 to obtain a constant non-pulsating current of a predetermined value.

The galvanometer-dynamometer arrangement shown will maintain the current flowing through it at a fixed value which is dependent solely on the constants of the galvanometer and dynamometer. Should the oscillator circuit, through aging of components or temperature changes, alter its characteristics so that the position of the vane 20 is different for the same value of current, the action of the moving coils 3 and 10 upon the output means 16 and member 19 will be to reposition the vane 20 until the correct value of current is obtained. Thus, so long as the current at which the torques are equal lies on the inclined portion 28b of the curve 28 shown in Fig. 3, the arrangement shown will effect control in spite of wide fluctuations in the oscillator circuit characteristics.

Thus, as illustrated, this invention provides a method of current control which is independent of wide variations of the characteristics of the variable current source, and since the moving coil 3 of the galvanometer and the moving coil 10 of the dynamometer do not use restoring springs, the errors due to springs are eliminated. The use of the vane 20 as the current control element provides an extremely sensitive means for varying the current, since it does not have the disadvantage and inherent error of contact friction. It is obvious of course that although I have used a specific vane controlled oscillator circuit in describing my invention, that any other form of apparatus, including different oscillator circuits, in which the controlled current can be varied by the torque exerted by the output means 16, could be used in its place.

What is claimed is:

1. A control apparatus comprising a permanent magnet moving coil galvanometer having a coil movable responsively to an input current, a permanent magnet having a gap between its poles in which said coil is disposed, and mounting means for said coil, said mounting means constraining said coil to rotate in said gap while exerting substantially no restoring torque on said coil, a dynamometer having a coil movable responsively to said input current, a moving coil, stationary coils, and mounting means for said dynamometer coil, said mounting means constraining said dynamometer coil to rotate between said stationary coils while exerting substantially no restoring torque on said moving coil, a circuit through which the input current is adapted to flow including in series said galvanometer coil, said dynamometer movable coil and said dynamometer stationary coils, and output means coupled to each of said moving coils, said output means being responsive to the differential of the torques of said moving coils.

2. A control apparatus comprising first electromechanical means including an operating coil responsive to an input current therein to produce a torque directly proportional to the magnitude of said current, a second electromechanical means including an operating coil responsive to an input current therein to produce a torque proportional to the square of the magnitude of the last mentioned current, means connecting said coils in series to cause the same current to flow through both of said coils, and output means coupled to said first and second electromechanical means, said output means being operable to produce an output proportional to the differential of said torques.

3. A current controlling apparatus comprising an electronic tube provided with grid and plate circuits, windings in said grid and plate circuits arranged to inductively cooperate with each other to maintain an oscillatory condition in said electronic tube, a permanent magnet moving coil galvanometer connected to said plate circuit and responsive to the non-pulsating component of the current therein to produce a torque directly proportional to the magnitude of said non-pulsating current, a dynamometer connected in series with said galvanometer and responsive to said non-pulsating current to produce a torque proportional to the square of the magnitude of said non-pulsating current, a work circuit connected in series with said dynamometer, an output means coupled to said galvanometer and dynamometer, said output means being responsive to the differential of said torques, and means operatively associated with said output means for varying the inductive relation of said windings to vary said oscillatory condition and thereby vary said non-pulsating component of the current.

4. A current controlling apparatus comprising an electronic tube provided with an oscillation circuit, a first electromechanical means connected to said circuit to respond only to the non-pulsating component of the current in said circuit, said first electromechanical means being responsive to said non-pulsating current to produce a torque directly proportional to the magnitude of said non-pulsating current, a second electromechanical means responsive to said non-pulsating current to produce a torque proportional to the square of the magnitude of said non-pulsating current, an output means coupled to said first and second electromechanical means, said output means being responsive to the differential of said torques of said first and second electromechanical means, means for varying an oscillatory condition of said electronic tube and thereby the magnitude of the said non-pulsating current, said means being connected to and responsive to said output means, and a utilization circuit connected to be energized by said non-pulsating current.

5. A current controlling apparatus comprising electrical input terminals for connection to a source of current, a first electromechanical means having an operating coil which produces an output directly proportional to the magnitude of a current therein, a second electromechanical means having an operating coil which produces an output proportional to the square of the magnitude of a current therein, means connecting said coils in series to said terminals to cause the same current to flow through both of said coils, an output means operatively associated with said first and second electromechanical means, said output means being responsive to the differential of said outputs of said first and second electromechanical means, and means operable to vary said current which flows through said coils, the last mentioned means being operably connected to said output means.

References Cited in the file of this patent

UNITED STATES PATENTS 2,371,415    Tolson _____ Mar. 13, 1945